(12) United States Patent
Matsunaga et al.

(10) Patent No.: US 10,578,714 B2
(45) Date of Patent: Mar. 3, 2020

(54) VEHICLE CONTROL APPARATUS AND VEHICLE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Syogo Matsunaga, Kariya (JP); Jun Tsuchida, Okazaki (JP); Ichiro Aizawa, Toyota (JP)

(73) Assignees: DENSO CORPORATION, Kariya, Aich-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 330 days.

(21) Appl. No.: 15/562,365

(22) PCT Filed: Mar. 8, 2016

(86) PCT No.: PCT/JP2016/057137
§ 371 (c)(1),
(2) Date: Sep. 27, 2017

(87) PCT Pub. No.: WO2016/158238
PCT Pub. Date: Oct. 6, 2016

(65) Prior Publication Data
US 2018/0120417 A1    May 3, 2018

(30) Foreign Application Priority Data
Mar. 31, 2015  (JP) ................................ 2015-072953

(51) Int. Cl.
*G01S 7/40*  (2006.01)
*B60W 30/08*  (2012.01)
(Continued)

(52) U.S. Cl.
CPC .............. *G01S 7/4026* (2013.01); *B60T 7/12* (2013.01); *B60T 7/22* (2013.01); *B60T 8/17558* (2013.01);
(Continued)

(58) Field of Classification Search
CPC .... G01S 7/4026; G01S 13/867; G01S 13/931; G01S 2007/403; G01S 2007/4091;
(Continued)

(56) References Cited

U.S. PATENT DOCUMENTS

| | | | | |
|---|---|---|---|---|
| 2015/0115571 | A1* | 4/2015 | Zhang | ............ B60D 1/06 |
| | | | | 280/477 |
| 2015/0276923 | A1* | 10/2015 | Song | ............ G01S 7/4004 |
| | | | | 702/97 |
| 2017/0176590 | A1* | 6/2017 | Sharonov | ............... G01S 13/92 |

FOREIGN PATENT DOCUMENTS

| | | | | |
|---|---|---|---|---|
| JP | 10039014 | A  * | 2/1998 | ............ G01S 13/93 |
| JP | H10-132939 | A | 5/1998 | |

(Continued)

*Primary Examiner* — Peter M Bythrow
*Assistant Examiner* — Nuzhat Pervin
(74) *Attorney, Agent, or Firm* — Knobbe, Martens, Olson & Bear, LLP (57) ABSTRACT

A vehicle control apparatus performs traveling control of a vehicle based on a detection result of a radar apparatus that detects a target in the periphery of an own vehicle. The vehicle control apparatus calculates a shaft misalignment angle that is a misalignment amount of an attachment angle of the radar apparatus and a shaft misalignment direction, and sets a detection range over which a target to be subjected to traveling control of the own vehicle is detected. Until elapse of a predetermined initial period after startup, a width in a lateral direction of the detection range is reduced based on a predetermined initial angle that is the misalignment amount of the attachment angle of the radar apparatus. After the elapse of the initial period after startup, the width in the
(Continued)

lateral direction of the detection range is reduced based on calculation values of the shaft misalignment angle and the shaft misalignment direction.

16 Claims, 5 Drawing Sheets (51) Int. Cl.
| | |
|---|---|
| *B60T 7/12* | (2006.01) |
| *G01S 13/86* | (2006.01) |
| *B60T 8/1755* | (2006.01) |
| *B60T 7/22* | (2006.01) |
| *G08G 1/16* | (2006.01) |
| *B60W 30/085* | (2012.01) |
| *B60W 50/14* | (2012.01) |
| *B60W 30/09* | (2012.01) |
| *G01S 13/93* | (2006.01) |
| *B60W 10/30* | (2006.01) |
| *B60W 10/18* | (2012.01) |
| *B60R 21/013* | (2006.01) |
| *B60R 21/0134* | (2006.01) |
| *G01S 13/931* | (2020.01) |

(52) U.S. Cl.
CPC ............ *B60W 10/18* (2013.01); *B60W 10/30* (2013.01); *B60W 30/08* (2013.01); *B60W 30/085* (2013.01); *B60W 30/09* (2013.01); *B60W 50/14* (2013.01); *G01S 13/867* (2013.01); *G01S 13/931* (2013.01); *G08G 1/16* (2013.01); *G08G 1/165* (2013.01); *G08G 1/166* (2013.01); *B60R 21/013* (2013.01); *B60R 21/0134* (2013.01); *B60T 2201/022* (2013.01); *B60W 2050/143* (2013.01); *B60W 2420/42* (2013.01); *B60W 2420/52* (2013.01); *B60W 2520/10* (2013.01); *B60W 2520/14* (2013.01); *B60W 2540/18* (2013.01); *B60W 2550/10* (2013.01); *B60W 2710/18* (2013.01); *G01S 2007/403* (2013.01); *G01S 2007/4091* (2013.01); *G01S 2013/9353* (2013.01); *G01S 2013/9367* (2013.01); *G01S 2013/9375* (2013.01); *G01S 2013/9389* (2013.01); *G01S 2013/9392* (2013.01)

(58) Field of Classification Search
CPC ..... G01S 2013/9353; G01S 2013/9367; G01S 2013/9375; G01S 2013/9389; G01S 2013/9392; B60T 7/12; B60T 7/22; B60T 8/17558; B60T 2201/022; B60W 10/18; B60W 10/30; B60W 30/08; B60W 30/085; B60W 30/09; B60W 50/14; B60W 2050/143; B60W 2420/42; B60W 2420/52; B60W 2520/10; B60W 2520/14; B60W 2540/18; B60W 2550/10; B60W 2710/18; G08G 1/16; G08G 1/165; G08G 1/166; B60R 21/013; B60R 21/0134
See application file for complete search history.

(56) References Cited

FOREIGN PATENT DOCUMENTS

| | | | | |
|---|---|---|---|---|
| JP | 2006-240453 | | 9/2006 | |
| JP | 2007-290708 | | 11/2007 | |
| JP | 2011232139 | A * | 11/2011 | ............ G01S 17/87 |
| JP | 2012-066777 | | 4/2012 | |
| JP | 2012068216 | A * | 4/2012 | ............... G01S 7/40 |
| JP | 2013-018393 | | 1/2013 | |
| JP | 5312493 | B2 * | 10/2013 | ............ G01S 13/93 |
| JP | 2016-191682 | | 11/2016 | |
| JP | 2016-191686 | | 11/2016 | |

* cited by examiner

VEHICLE CONTROL APPARATUS AND VEHICLE CONTROL METHOD

CROSS-REFERENCE TO RELATED APPLICATIONS

The present application is based on and claims the benefit of priority from Japanese Patent Application No. 2015-072953, filed on Mar. 31, 2015, the descriptions of which are incorporated herein by reference.

TECHNICAL FIELD

The present disclosure relates to a vehicle control apparatus that performs traveling control of an own vehicle with respect to a target ahead of the own vehicle that has been detected by a target detection apparatus, and a vehicle control method performed by the vehicle control apparatus.

BACKGROUND ART

Pre-crash safety (PCS) systems that reduce or prevent collision damage between an obstacle (target) and an own vehicle have been produced. The obstacle is another vehicle, a pedestrian, a road structure, or the like present ahead of the own vehicle that has been detected by a target detection apparatus, such as an imaging apparatus or a radar apparatus. In PCS, a collision prediction time (time to collision [TTC]) is determined based on a relative distance between the own vehicle and the obstacle, and a relative speed or a relative acceleration. The collision prediction time is an amount of time until a collision occurs between the own vehicle and the obstacle. Based on the collision prediction time, a driver of the own vehicle is notified of approach by a warning apparatus, or a braking apparatus of the own vehicle is operated.

However, when axial misalignment in which an attachment angle of the target detection apparatus becomes tilted occurs, an obstacle that is not actually positioned ahead of the own vehicle is erroneously detected as being ahead of the own vehicle. The axial misalignment of the target detection apparatus may occur as a result of vibrations applied during vehicle traveling, an occurrence of light impact on the own vehicle, and the like.

Therefore, since the past, axial misalignment detection for the target detection apparatus has been performed. For example, when a radar apparatus is used as the target detection apparatus, angle misalignment information of the radar apparatus is acquired from a movement trajectory of a road-side object detected by the radar apparatus. Then, as a result of a history of the angle misalignment information being statistically processed, an axial misalignment angle of the radar apparatus is calculated (refer to PTL 1).

CITATION LIST

Patent Literature

[PTL 1] JP-A-10-132939

SUMMARY OF INVENTION

When the axial misalignment angle is calculated by statistical processing, time is required until determination accuracy regarding the axial misalignment improves. Therefore, in a state in which calculation accuracy regarding the axial misalignment angle is low, the axial misalignment angle may not be correctly calculated. An unexpected unnecessary assistance operation may be performed with respect to an obstacle that is erroneously determined to be present ahead of the own vehicle.

The main object of the present disclosure is to provide a vehicle control apparatus that is capable of suppressing unnecessary assistance operations with respect to a target, and a vehicle control method.

A first aspect of the present disclosure is a vehicle control apparatus (10) that is applied to a vehicle in which a target detecting means (21) that detects a target in a periphery of an own vehicle (50) is provided, and performs traveling control of the vehicle based on a detection result of the target detecting means. The vehicle control apparatus includes: an acquiring means for acquiring, at a predetermined cycle, angle misalignment information of the target detecting means that is calculated based on a detection position of the target by the target detecting means; a calculating means for calculating an axial misalignment angle that is a misalignment amount of an attachment angle of the target detecting means and an axial misalignment direction that indicates either of left and right sides with respect to the own vehicle on which the axial misalignment of the target detecting means has occurred, by statistically processing a history after startup of the angle misalignment information acquired by the acquiring means; a detection range setting means for setting, ahead of the own vehicle, a detection range over which a target to be subjected to traveling control of the own vehicle, among targets detected by the target detecting means, is detected; and a detection range restricting means for reducing a width in a lateral direction of the detection range based on a predetermined initial angle, the initial angle being the misalignment amount of the attachment angle of the target detecting means, until elapse of a predetermined initial period after startup, and reducing the width in the lateral direction of the detection range based on the axial misalignment angle and the axial misalignment direction calculated by the calculating means after the elapse of the initial period after the startup.

According to the first aspect of the present disclosure, during the initial period, the width in the lateral direction of the detection range over which the target to be subjected to traveling control of the own vehicle is detected is reduced using the predetermined initial angle. In this case, even when axial misalignment in either of the leftward and rightward directions occurs in the target detecting means during the initial period in which accuracy of the axial misalignment angle is low, a target that is not present ahead of the own vehicle being erroneously determined to be a target to be subjected to traveling control can be suppressed.

In addition, in a state in which the initial period has elapsed and detection of the axial misalignment angle and the axial misalignment direction of the target detecting means becomes possible, the width in the lateral direction of the detection range is reduced based on the axial misalignment angle and the axial misalignment direction. Therefore, a target that is not present ahead of the own vehicle being erroneously determined to be a target to be subjected to traveling control can be suppressed based on the occurrence state of the axial misalignment in the target detecting means.

BRIEF DESCRIPTION OF DRAWINGS

The above-described object, other objects, characteristics, and advantages of the present disclosure will clarified through the detailed description below, with reference to the accompanying drawings. In the drawings.

DESCRIPTION OF EMBODIMENTS

Each embodiment will hereinafter be described with reference to the drawings. Sections that are identical or equivalent to each other among the following embodiments are given the same reference numbers in the drawings. Descriptions of sections having the same reference numbers are applicable therebetween A vehicle control apparatus according to the present embodiment is mounted in a vehicle (own vehicle). The vehicle control apparatus functions as a PCS system that detects a target present ahead of the own vehicle and performs control to prevent a collision with the target or reduce collision damage.

Figure 1:
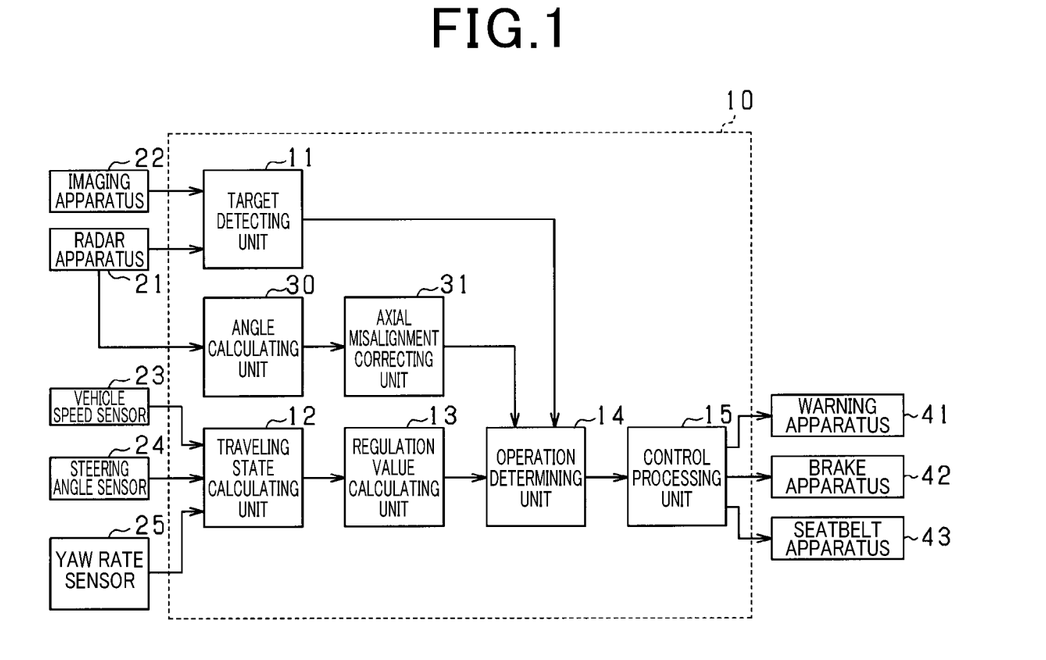
FIG. 1 is a configuration diagram showing a vehicle control apparatus according to an embodiment.

In FIG. 1, a driving assistance electronic control unit (ECU) 10 that is the vehicle control apparatus is a computer that includes a central processing unit (CPU), a read-only memory (ROM), a random access memory (RAM), an input/output (I/O) interface, and the like (not shown). The driving assistance ECU 10 actualizes each function as a result of the CPU running programs installed in the ROM. Therefore, the ROM corresponds to a storage medium (non-transitory computer readable medium).

As sensor apparatuses that input various types of detection information, a radar apparatus 21, an imaging apparatus 22, a vehicle speed sensor 23, a steering angle sensor 24, and a yaw rate sensor 25 are connected to the driving assistance ECU 10.

Figure 2:
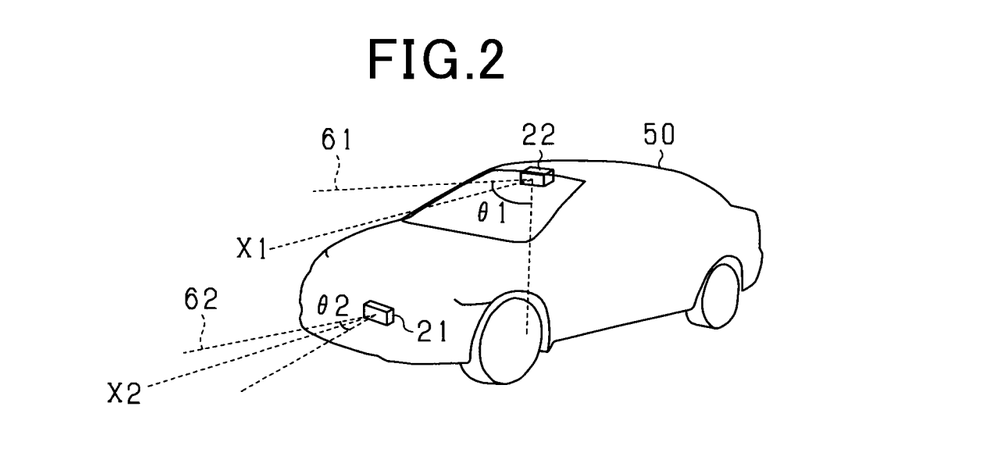
FIG. 2 is a diagram showing an arrangement of an imaging apparatus and a radar apparatus according to an embodiment.

The radar apparatus 21 is an apparatus that transmits electromagnetic waves as transmission waves, and detects a target in the periphery of an own vehicle 50 by receiving reflected waves of the electromagnetic waves. For example, the radar apparatus 21 is configured by a millimeter-wave radar or a laser radar. As shown in FIG. 2, the radar apparatus 21 is attached to a front portion of the own vehicle 50 such that an optical axis X2 thereof faces ahead of the vehicle. In addition, the radar apparatus 21 scans an area 62 by radar signals. The area 62 spreads over a range of a predetermined angle θ2 ahead of the vehicle with the optical axis X2 at the center. The radar apparatus 21 then generates distance measurement data based on an amount of time from the transmission of electromagnetic waves ahead of the vehicle until the reception of reflected waves. The radar apparatus 21 transmits the generated distance measurement data to the driving assistance ECU 10. The distance measurement data includes information related to an orientation at which the target is present, a distance to the target, and a relative speed.

The imaging apparatus 22 is an onboard camera. The imaging apparatus 22 is configured by a charge-coupled device (CCD) camera, a complementary metal-oxide semiconductor (CMOS) image sensor, a near-infrared camera, or the like. The imaging apparatus 22 captures an image of a peripheral environment including a traveling road of the own vehicle 50. The imaging apparatus 22 generates image data expressing the captured image and successively outputs the image data to the driving assistance ECU 10. As shown in FIG. 2, for example, the imaging apparatus 22 according to the present embodiment is set near an upper side of a front windshield of the own vehicle 50. The imaging apparatus 22 captures an image of an area 61 that spreads over a range of a predetermined angle θ1 (θ1>θ2) ahead of the vehicle with an imaging axis X1 at the center. Then, the imaging apparatus 22 extracts feature points that indicate the presence of a target in the captured image. Specifically, the imaging apparatus 22 extracts edge points based on luminance information of the captured image, and performs a Hough transform on the extracted edge points. For example, in the Hough transform, a point on a straight line on which a plurality of edge points are continuously arrayed, or a point at which straight lines intersect is extracted as the feature point. The imaging apparatus 22 may be a single-lens camera or a stereo camera.

The vehicle speed sensor 23 is provided in a rotation shaft that transmits power to the wheels of the own vehicle 50. The vehicle speed sensor 23 determines a speed of the own vehicle 50 based on the number of rotations of the rotation shaft. The steering angle sensor 24 detects, as a steering angle, an angle by which a steering wheel of the own vehicle 50 is rotatably operated. The yaw rate sensor 25 detects a yaw rate that is actually generated in the own vehicle 50, that is, an angular velocity around the center of gravity of the vehicle. For example, the yaw rate sensor 25 has an oscillator such as a tuning fork, and detects the yaw rate of the own vehicle 50 by detecting skew generated in the oscillator based on a yaw moment of the own vehicle 50. The vehicle speed sensor 23, the steering angle sensor 24, and the yaw rate sensor 25 detect a traveling state (behavior) of the own vehicle 50.

The own vehicle 50 includes a warning apparatus 41, a brake apparatus 42, and a seatbelt apparatus 43 as safety apparatuses that are driven based on control commands from the driving assistance ECU 10.

The warning apparatus 41 is a speaker or a display that is set inside a cabin of the own vehicle 50. When the driving assistance ECU 10 determines that the likelihood of a collision with an obstacle has increased, the warning apparatus 41 notifies a driver of the risk of collision by outputting a warning sound, a warning message, or the like based on the control command from the driving assistance ECU 10.

The brake apparatus 42 is a braking apparatus that applies brakes to the own vehicle 50. When the driving assistance ECU 10 determines that the likelihood of a collision with an obstacle has increased, the brake apparatus 41 operates based on the control command from the driving assistance ECU 10. Specifically, the brake apparatus 42 increases braking force with respect to a brake operation by the driver (brake assistance function), or performs automatic braking when the driver does not perform a braking operation (automatic brake function).

The seatbelt apparatus 43 is a pretensioner that retracts a seatbelt provided for each seat of the own vehicle 50. When the driving assistance ECU 10 determines that the likelihood of a collision with an obstacle has increased, the seatbelt apparatus 43 performs a preparation operation for retraction of the seatbelt based on the control command from the driving assistance ECU 10. In addition, when the collision cannot be avoided, the seatbelt apparatus 43 retracts the seatbelt and eliminates slack, thereby fixing a passenger, such as the driver, to the seat and protecting the passenger.

A target detecting unit 11 acquires first detection information from the radar apparatus 21 and second detection information from the imaging apparatus 22. Then, regarding a first position that is a position obtained from the first detection information and a second position that is a feature point obtained from the second detection information, the target detecting unit 11 associates the first position and the second position that are positioned in proximity as being based on the same target. When a second position is present near the first position, the likelihood of a target actually being present in the first position is high. A state in which the position of a target is accurately acquired by the radar apparatus 21 and the imaging apparatus 22 is referred to as a fusion state. Regarding a target that is determined to be in the fusion state, whether or not the target is continuously in the fusion state is determined with reference to a detection history. Then, when the target is determined to continuously be in the fusion state, the target is determined to be present in that position. In addition, regarding the target that is in the fusion state, should the target be in an undetected state, the target is considered to be present in the previously-detected position for a predetermined period, with reference to the detection history.

Regarding the target that is determined to be in this fusion state, pattern matching using a preliminarily prepared pattern is performed with respect to the second detection information. The target detecting unit 11 then functions as a type determining means. The target detecting unit 11 determines whether the target is a vehicle or a pedestrian, and associates the determination with the target as type. The concept of a pedestrian may also include people on bicycles.

A traveling state calculating unit 12 determines the traveling state of the own vehicle 50 from the detection results of the vehicle speed sensor 23, the steering angle sensor 24, and the yaw rate sensor 25. Specifically, the traveling state calculating unit 12 calculates a movement amount in a lateral direction, a movement amount in a front/rear direction, and a rotation angle per unit time of the own vehicle 50, based on the vehicle speed, the yaw rate, and a vehicle center-of-gravity slip angle from the vehicle speed sensor 23, the steering angle sensor 24, and the yaw rate sensor 25. Calculation methods for these parameters are known. Detailed descriptions are omitted.

Figure 3:
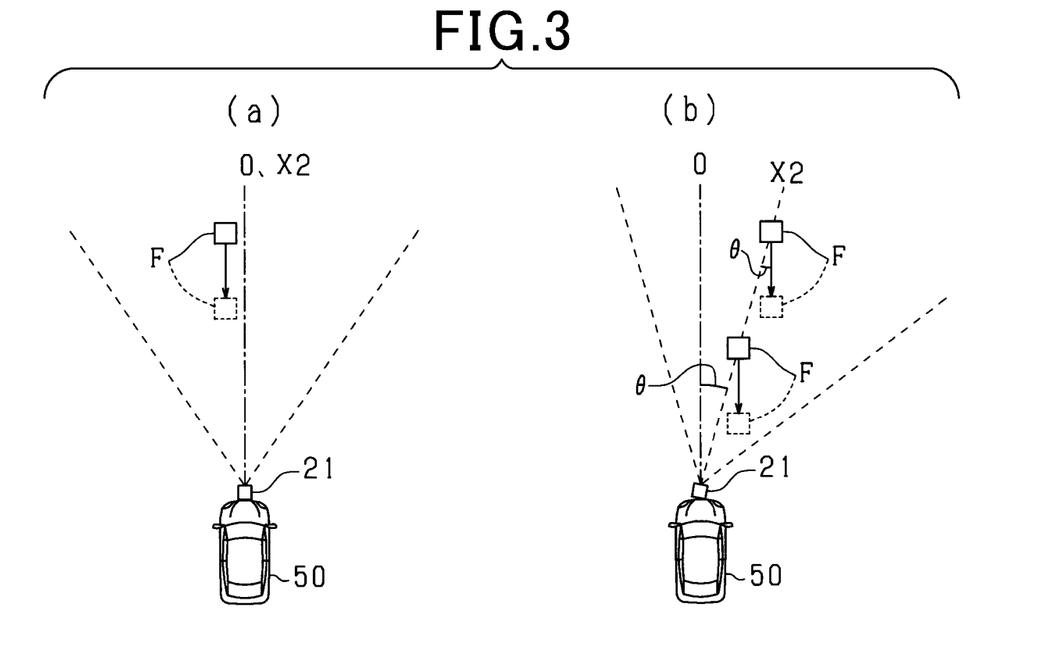
FIG. 3 is an explanatory diagram showing the principle of axial misalignment angle detection according to an embodiment.

An angle calculating unit 30 calculates an axial misalignment angle that is a misalignment amount of an attachment angle of the radar apparatus 21. The angle calculating unit 30 calculates an axial misalignment direction that indicates to which of either of a left side and a right side, with respect to the own vehicle 50, the axial misalignment of the radar apparatus 21 has occurred. Here, the calculation principle of the axial misalignment angle will be described. FIG. 3 is a diagram showing an aspect in which, during traveling of the own vehicle 50, a stationary object such as a road-side object is relatively moving with respect to the own vehicle 50. FIG. 3 illustrates, by (a), is a state in which the radar apparatus 21 is correctly attached. An axis O (axis in the front/rear direction) of the own vehicle 50 and the optical axis X2 of the radar apparatus 21 match. FIG. 3 illustrates, by (b), is a state which axial misalignment has occurred in the radar apparatus 21. Misalignment by an angle θ is present between the axis O of the own vehicle 50 and the optical axis X2.

In the case shown in FIG. 3 by (a), in a straight-ahead traveling state of the own vehicle 50, a target corresponding to a stationary object (referred to, hereafter, as a stationary target F) is detected as directly approaching the own vehicle 50. Meanwhile, in the case shown in FIG. 3 by (b), the stationary target F is erroneously detected as approaching the own vehicle 50 while laterally moving (diagonally moving) at the angle θ.

The angle calculating unit 30 acquires axial misalignment information (angle misalignment information) of the radar apparatus 21 from a movement trajectory on which the stationary target F relatively moves with respect to the own vehicle 50. The acquired axial misalignment information is collected in a storage unit such as the RAM of the driving assistance ECU 10. The axial misalignment information stored in the storage unit shows a distribution (dispersion, standard deviation) such as that shown in FIG. 4, due to effects of external noise and the like.

Figure 4:
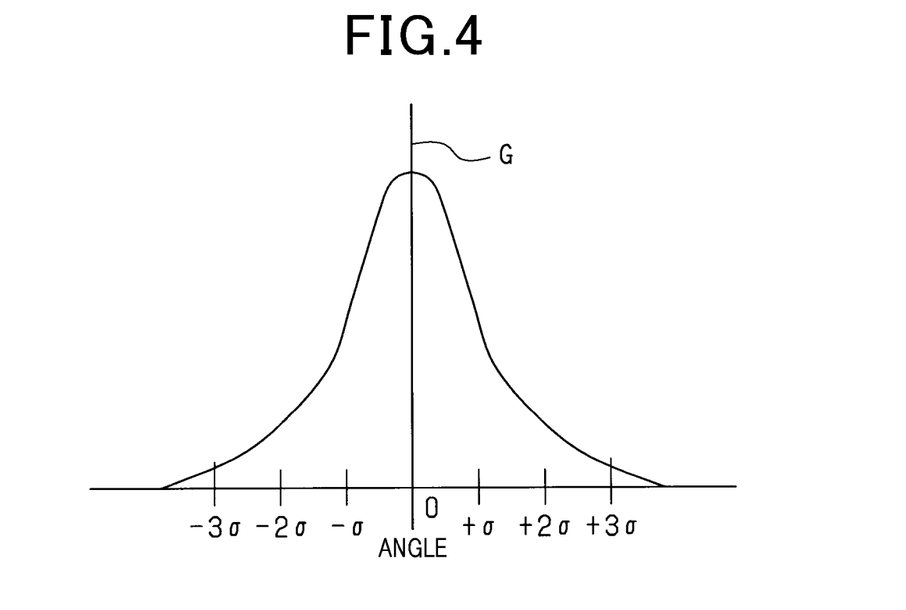
FIG. 4 is a diagram showing a distribution of axial misalignment amount according to an embodiment.

Here, the angle calculating unit 30 calculates the axial misalignment angle by statistically processing the history of the axial misalignment information. For example, an angle corresponding to a center of gravity G in the distribution of the axial misalignment information in FIG. 4 is calculated as the axial misalignment angle. As a result, the effect of dispersion in the axial misalignment information can be suppressed and calculation accuracy regarding the axial misalignment angle of the radar apparatus 21 can be improved.

However, when the axial misalignment angle is calculated by statistical processing of the history of the axial misalignment information, because the collection of axial misalignment information is small immediately after startup of the driving assistance ECU 10, the axial misalignment angle may not be calculated or, even should the axial misalignment angle be calculated, the accuracy thereof is low. For example, in FIG. 5, the axial misalignment angle is in an indeterminate state for a predetermined period (referred to, hereafter, as an initial period T1) after startup of the driving assistance ECU 10.

Figure 5:
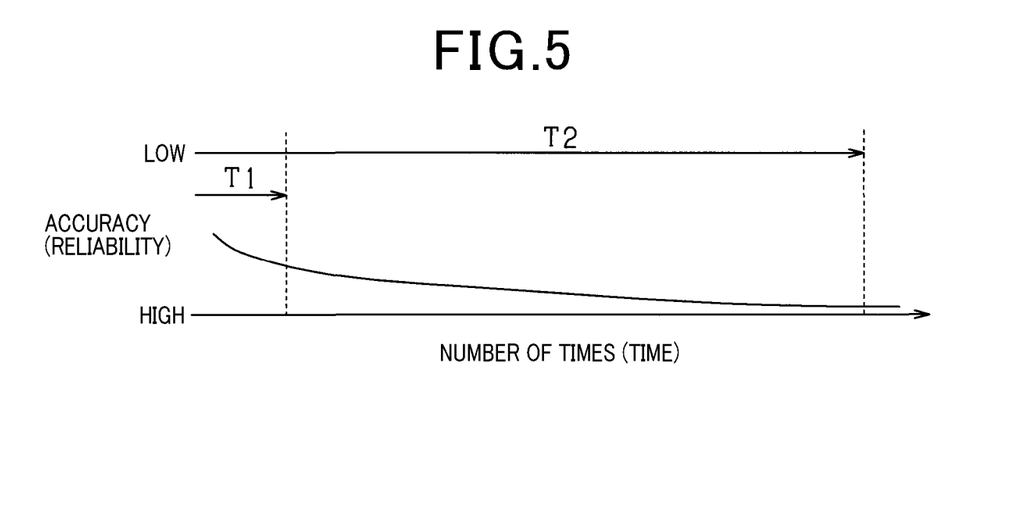
FIG. 5 is a diagram showing a relationship between detection time and detection accuracy regarding axial misalignment according to an embodiment.

Therefore, until the initial period T1 elapses after startup of the driving assistance ECU 10, the angle calculating unit 30 sets the misalignment amount of the attachment angle of the radar apparatus 21 to a predetermined angle (referred to, hereafter, as an initial angle). The initial angle is predetermined as an axial misalignment amount when axial misalignment occurs during normal use of the own vehicle, rather than that when a vehicle collision is premised. After the elapse of the initial period T1, the axial misalignment angle calculated based on the history of the axial misalignment information is outputted in a state in which the axial misalignment is collected to a certain extent.

It can be determined whether or not the present time is within the initial period T1, based on an acquisition count of the axial misalignment information after startup of the driving assistance ECU 10. That is, a control processing unit 15 determines that the present time is within the initial period T1 when the acquisition count of the axial misalignment information is less than a predetermined first threshold A. The control processing unit 15 determines that the present time is within a period after the elapse of the initial period T1 when the acquisition count of the axial misalignment information is equal to or greater than the first threshold A. For example, the first threshold A is set to n×1000 times (n=1, 2, . . . ).

An axial misalignment correcting unit 31 corrects position information of the optical axis X2 of the radar apparatus 21 based on the axial misalignment angle outputted from the angle calculating unit 30. As a result, the axial misalignment correcting unit 31 corrects position information of the target recognized by the driving assistance ECU 10.

The angle that can be corrected by the axial misalignment correcting unit 31 is limited to a predetermined angle range (such as an angle range corresponding to the area 61 that can be imaged by the imaging apparatus 22). Therefore, when axial misalignment that is equal to or greater than prescribed occurs in the radar apparatus 21, a state in which the calculation value of the axial misalignment angle of the radar apparatus 21 is equal to or greater than prescribed continues even when correction by the axial misalignment correcting unit 31 is repeated. Therefore, according to the present embodiment, when the state in which the calculation value of the axial misalignment angle of the radar apparatus 21 is equal to or greater than prescribed continues even when correction of the axial misalignment angle by the axial misalignment correcting unit 31 is repeated, collision avoidance control by the driving assistance ECU 10 is prohibited. Details of the determination of whether or not the collision avoidance control is permitted will be described hereafter.

Figure 6:
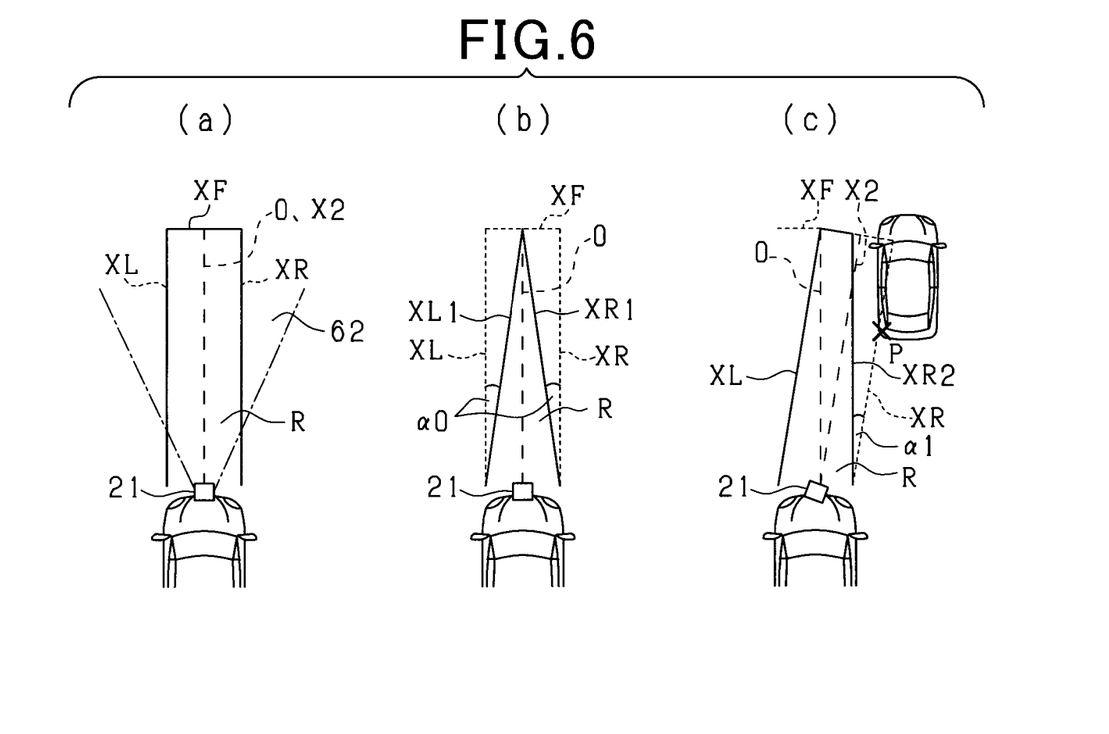
FIG. 6 is an explanatory diagram related to setting of a detection range for a target ahead of an own vehicle according to an embodiment.

A regulation value calculating unit 13 sets a detection range R for detecting a target that is subjected to the collision avoidance control of the own vehicle 50 ahead of the own vehicle 50. For example, as shown in FIG. 6 by (a), the detection range R is set as an area that is surrounded by a rightward regulation position XR, a leftward regulation position XL, and a forward regulation position XF. The rightward regulation position XR is set further to the right side than the axis O in the front/rear direction of the own vehicle 50. The leftward regulation position XL is set further to the left side than the axis O. The forward regulation position XF is set ahead of the own vehicle 50. The forward regulation position XF is set based on the vehicle speed of the own vehicle 50 or the like. The rightward regulation position XR and the leftward regulation position XL are set to match the traffic lane position in which the own vehicle 50 is traveling.

As a result of the foregoing, among the targets detected by the radar apparatus 21, a target that is positioned outside of the detection range R is not recognized as a subject for collision avoidance by the driving assistance ECU 10. Specifically, targets positioned further to the right side than the rightward regulation position XR, further to the left side than the leftward regulation position XL, and further back than the forward regulation position XF, with respect to the own vehicle 50, are not recognized as targets to be subjected to the collision avoidance control.

Here, when the attachment direction of the radar apparatus 21 is displaced in a horizontal direction (left/right direction) with respect to the own vehicle 50, an object (target) that is not present ahead of the own vehicle 50 may be erroneously recognized as a target that is a control subject for the collision avoidance control. For example, as shown in FIG. 6 by (c), when the attachment direction of the radar apparatus 21 is displaced in the rightward direction, a target P that is further to the right side than the rightward regulation position XR is erroneously recognized as a target that is a control subject for the collision avoidance control.

Therefore, when axial misalignment is present in the radar apparatus 21, the detection range R is narrowed based on an occurrence state (axial misalignment direction and axial misalignment angle) of the axial misalignment. As a result, erroneous determination of the target to be a control subject for the collision avoidance control can be prevented. For example, in the example shown in FIG. 6 by (c), when the right side (area on the right side with respect to the axis O of the own vehicle 50) of the detection range R is reduced, erroneous determination of the target P can be prevented.

However, as described above, time is required to correctly calculate the axial misalignment angle of the radar apparatus 21 by statistical processing. Therefore, in a state in which the collection of axial misalignment information is small and the determination accuracy regarding the axial misalignment of the radar apparatus 21 is low, the axial misalignment angle cannot be correctly calculated. In this case, the detection range R cannot be appropriately set based on the occurrence state of the axial misalignment. Thus, erroneous operation of the collision avoidance control with respect to a target that is not a control subject may not be suppressed.

Therefore, according to the present embodiment, as shown in FIG. 6 by (b), until the initial period T1 elapses, the control processing unit 15 reduces the width in a lateral direction of the detection range R, that is, the width in the left/right direction with respect to the own vehicle 50, with left-right symmetry (initial mode). Specifically, the rightward regulation position XR and the leftward regulation position XL are each angularly tilted in correspondence with an initial angle α0 in a direction (inward) approaching the axis O of the own vehicle 50. As a result, the width in the lateral direction of the detection range R is reduced with left-right symmetry by new regulation positions XR and XL being set. In this case, even when axial misalignment in either of the leftward and rightward directions occurs in the radar apparatus 21 during the initial period T1 in which identification of the axial misalignment direction of the radar apparatus 21 is difficult, erroneous determination of a target that is not a control subject as a target that is a control subject, and erroneous operation of the collision avoidance control with respect to the target that is not a control subject can be suppressed, regardless of the axial misalignment direction of the radar apparatus 21.

Then, after the elapse of the initial period T1, as a result of the axial misalignment information being collected, the angle calculating unit 30 can calculate the axial misalignment angle and the axial misalignment direction of the radar apparatus 21 from the movement trajectory of the target. Here, in this case, the control processing unit 15 reduces the detection range R based on the calculation values of the axial misalignment angle and the axial misalignment direction (restriction mode).

As shown in FIG. 4, the history of the axial misalignment information has a predetermined distribution (dispersion). The distribution (dispersion) of the axial misalignment information changes together with the calculation accuracy regarding the axial misalignment angle. Therefore, after the elapse of the initial period T1, the control processing unit 15 reduces the detection range R taking into consideration the distribution of the axial misalignment information. For example, the angle calculating unit 30 calculates an angle corresponding to 3σ (99.73%) of the axial misalignment information as a correction value (referred to, hereafter, as a statistical dispersion quantity) by statistically processing the history of the axial misalignment information (see FIG. 4). Then, the control processing unit 15 calculates an angle by which to reduce the detection range R using a sum of the calculation value of the axial misalignment angle and the statistical dispersion quantity. In this way, when the angle by which to reduce the detection range R is calculated taking into consideration the dispersion in the history of the axial misalignment information, the detection range R can be more appropriately set based on the calculation accuracy regarding the axial misalignment angle at this time.

In addition, in the restriction mode, the control processing unit 15 reduces the width in the lateral direction of the detection range R with left-right asymmetry with respect to the axis O of the own vehicle 50. Specifically, of the rightward regulation position XR and the left regulation position XL, the side corresponding to the axial misalignment direction is tilted towards the axis O of the own vehicle 50 by the angle calculated based on the axial misalignment angle and the statistical dispersion quantity. As a result, the lateral direction of the detection range R is reduced with left-right asymmetry by the new regulation position being set.

For example, as shown in FIG. 6 by (c), when axial misalignment in the rightward direction occurs in the radar apparatus 21, the rightward regulation position XR on the right side with respect to the axis O of the own vehicle 50 is tilted inward by a tilt angle α1. As a result, a regulation position XR2 on the right side of the detection range R is reset. In this way, in the detection range R, when only the side corresponding to the axial misalignment direction of the radar apparatus 21 is reduced, erroneous determination of the target that is the control subject can be suppressed while ensuring the detection range R for the target ahead of the own vehicle 50.

An operation determining unit 14 determines whether or not a target is present in the detection range R set by the regulation value calculating unit 13. When a target is present in the detection range R, the operation determining unit 14 calculates a collision prediction time, which is the time to collision between the own vehicle 50 and the target. For example, the collision prediction time is calculated based on the distance between the own vehicle 50 and the target and the relative speed.

The control processing unit 15 compares the collision prediction time calculated by the operation determining unit 14, and an operation timing individually set for each of the warning apparatus 41, the brake apparatus 42, and the seatbelt apparatus 43, which are the safety apparatuses. Then, when the collision prediction time is less than the operation timing of a safety apparatus, the control processing unit 15 transmits a command signal to the corresponding safety apparatus. As a result, a safety apparatus among at least any of the warning apparatus 41, the brake apparatus 42, and the seatbelt apparatus 43 is operated, and the driver is notified of the risk of collision.

In addition, in cases in which the calculation value of the axial misalignment angle is outside the allowable range even when correction of the axial misalignment angle by the axial misalignment correcting unit 31 is repeatedly performed, the control processing unit 15 prohibits the collision avoidance control. For example, when the axial misalignment angle is outside the allowable range upon elapse of a predetermined period (referred to, hereafter, as a determination period T2) elapses after startup of the driving assistance ECU 10, the control processing unit 31 prohibits the collision avoidance control. For example, the determination period T2 can be determined based on the acquisition count of the axial misalignment information after startup. For example, the determination period T2 is determined to be reached when the acquisition count of the axial misalignment information becomes a second threshold B. For example, the second threshold B is set to n×10,000 times (n=1, 2, 3 . . . ).

Figure 7:
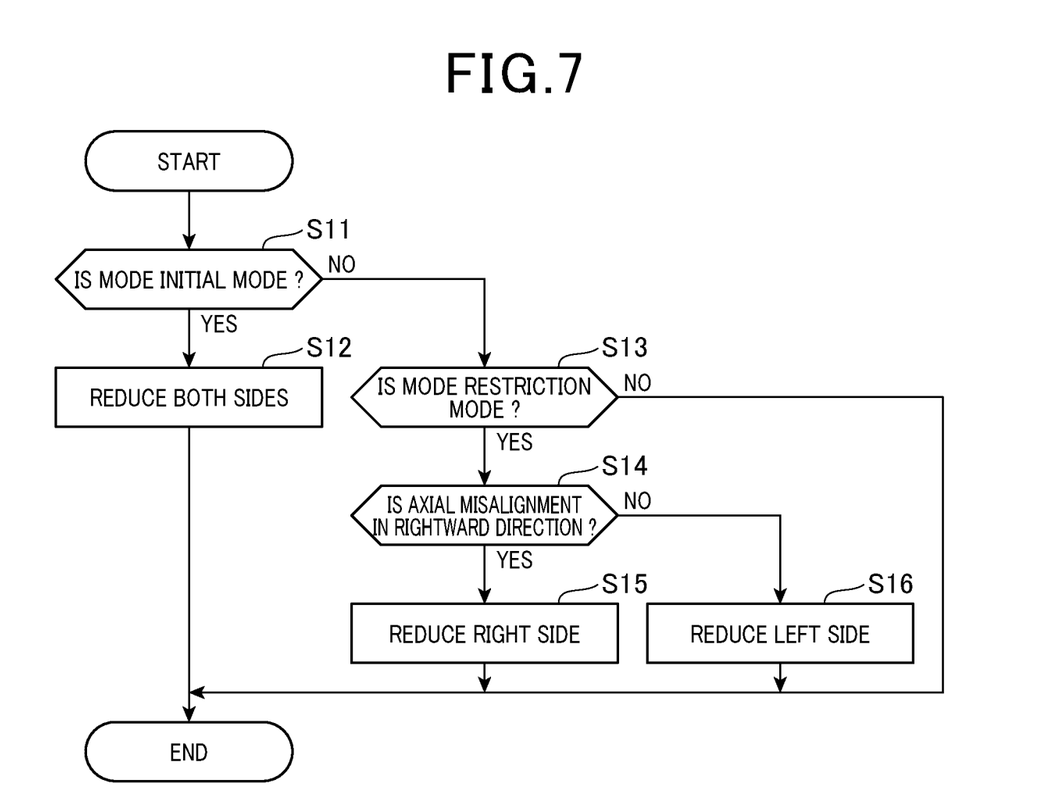
FIG. 7 is a flowchart showing the processing steps of a driving assistance ECU according to an embodiment.

Next, a setting process for the detection range R performed by the driving assistance ECU 10 will be described. FIG. 7 is a flowchart of the setting process for the detection range R. The process below is repeatedly performed at a predetermined cycle after an ignition switch (not shown) is turned on.

In FIG. 7, the driving assistance ECU 10 determines whether or not the mode is the initial mode (step S11). The present process is affirmative when the acquisition count of the axial misalignment information is less than the first threshold A. When determined that the mode is the initial mode, the driving assistance ECU 10 reduces the detection range R with left-right symmetry by setting new regulation positions XR1 and XL1 of the detection range R by tilting both of the rightward regulation position XR and the leftward regulation position XL inward by an angle corresponding to the initial angle (step S12).

When negative at step S11, the driving assistance ECU 10 determines whether or not the mode is the restriction mode (step S13). The present process is affirmative when the acquisition count of the axial misalignment information is equal to or greater than the first threshold A and less than the second threshold B. When determined that the mode is the restriction mode, the driving assistance ECU 10 determines whether or not the axial misalignment direction of the radar apparatus 21 is the rightward direction (step S14). The present process can be determined based on a calculation result of the movement trajectory of the target. When determined that the axial misalignment of the radar apparatus 21 is in the rightward direction at step S14, the area on the right side with respect to the axis O of the own vehicle 50 is reduced at an angle calculated based on the axial misalignment angle and the statistical dispersion quantity. That is, the detection range R is reduced by the regulation position XR2 on the right side of the detection range R being reset to a position in which the rightward regulation position XR is tilted to the rightward direction. When determined negative at step S14, that is, when the tilt direction of the radar apparatus 21 is the leftward direction, the area on the left side with respect to the axis O of the own vehicle 50 is reduced using the axial misalignment angle calculated taking into consideration the statistical dispersion quantity. That is, the detection range R is reduced by the regulation position on the left side of the detection range R being reset to a position in which the leftward regulation position XL is tilted to the leftward direction by the tilt angle α1 (step S16). When a negative determination is made at step S13, the process is ended. In this case, the detection range R is not restricted.

Next, an execution example of the above-described process will be described. In the description below, a state in which the optical axis X2 of the radar apparatus 21 is displaced in the rightward direction with respect to the axis O of the own vehicle 50 is presumed.

When the driving assistance ECU 10 is started, the acquisition of the axial misalignment information is started. In addition, the mode is the initial mode. The width in the lateral direction of the detection range R is reduced with left-right symmetry based on the initial angle (see FIG. 6 by (b)). Then, a determination is made regarding whether or not collision avoidance with respect to a target within the detection range R prescribed as the area within the regulation positions XR1 and XL2 is to be performed. Subsequently, when the calculation count for the axial misalignment angle becomes equal to or greater than the first threshold A, the mode transitions to the restriction mode. In the restriction mode, the axial misalignment direction of the radar apparatus 21 is determined from the information on the movement trajectory of the target. Here, the radar apparatus 21 is determined to be axially displaced in the rightward direction. Therefore, the area on the right side with respect to the axis O of the own vehicle 50 is reduced (see FIG. 6 by (c)). Subsequently, when the axial misalignment angle of the radar apparatus 21 is equal to or greater than prescribed when the calculation count for the axial misalignment angle becomes equal to or greater than the second threshold B, the collision avoidance control is prohibited.

Here, the radar apparatus 21 according to the present embodiment corresponds to a target detecting means recited in the claims. The angle calculating unit 30 according to the present embodiment corresponds to an acquiring means, a calculating means, and a means for calculating a statistical dispersion quantity of the angle misalignment information recited in the claims. The regulation value calculating unit 13 corresponds to a detection range setting means recited in the claims. The control processing unit 15 according to the present embodiment corresponds to a detection range restricting means and a means for determining that the present time is within the initial period recited in the claims.

As a result of the description above, the following excellent effects can be achieved.

In the configuration in which the angle misalignment information of the radar apparatus 21 is acquired at a predetermined cycle and the axial misalignment angle is calculated by statistical processing of the history of the angle misalignment information after startup, until the predetermined initial period elapses after startup, the axial misalignment angle is not known or, even when the axial misalignment angle is known, the accuracy thereof is low. Therefore, during the initial period, the width in the lateral direction of the detection range R over which the target to be subjected to traveling control of the own vehicle 50 is detected is reduced using the predetermined initial angle. In this case, even when axial misalignment in either of the leftward and rightward directions occurs in the target detecting means during the initial period in which accuracy of the axial misalignment angle is low, a target that is not present ahead of the own vehicle being erroneously determined to be a target to be subjected to traveling control of the own vehicle 50 can be suppressed. In addition, in a state in which the initial period has elapsed and detection of the axial misalignment angle and the axial misalignment direction of the target detecting means becomes possible, the width in the lateral direction of the detection range R is reduced based on the axial misalignment angle and the axial misalignment direction. Therefore, a target that is not present ahead of the own vehicle 50 being erroneously determined to be a target to be subjected to traveling control can be suppressed based on the occurrence state of the axial misalignment in the target detecting means.

The detection range R is reduced with left-right symmetry until the initial period elapses after startup. As a result, even when axial misalignment in either of the leftward and rightward directions occurs in the target detecting means during the initial period in which the calculation accuracy regarding the axial misalignment angle is low, a target that is not present ahead of the own vehicle being erroneously determined to be a target to be subjected to traveling control can be suppressed.

The history of the axial misalignment information has a predetermined distribution. Therefore, the side of the detection range R corresponding to the axial misalignment direction is reduced using the angle calculated based on the axial misalignment angle and the statistical dispersion quantity of the angle misalignment information. In this case, after the elapse of the initial period, the detection range R for the target can be set taking into consideration the dispersion in the history of the axial misalignment information. The effect of suppressing erroneous determination of the target to be subjected to traveling control can be improved.

The present invention is not limited to the description above and may be carried out in the following manner.

Figure 8:
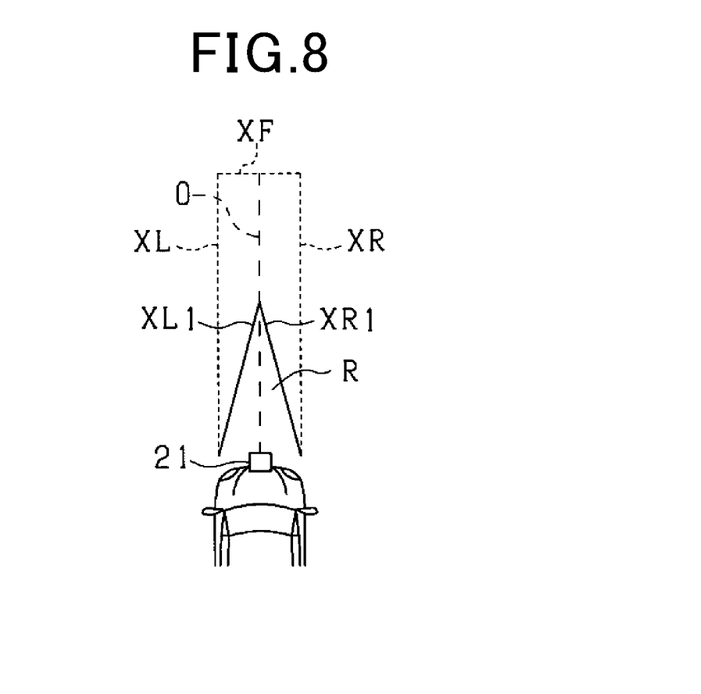
FIG. 8 is an explanatory diagram related to setting of a detection range in a modified example according to an embodiment.

In the description above, the extent to which the width in the lateral direction of the detection range R is reduced in the initial mode may be variably set. For example, upon startup of the driving assistance ECU 10, the values of an acceleration sensor (not shown) mounted in the radar apparatus 21 and an acceleration sensor (not shown) mounted in the vehicle are compared. When the information of both acceleration sensors match, the likelihood of axial misalignment occurring in the radar apparatus 21 is high. As shown in FIG. 8, the extent to which the width in the lateral direction of the detection range R is reduced is increased. In this case, when the likelihood of axial misalignment occurring in the radar apparatus 21 is high in the initial mode, the detection range R is further narrowed. The effect of suppressing unnecessary traveling control with respect to a target that is not a control subject can be improved.

Figure 9:
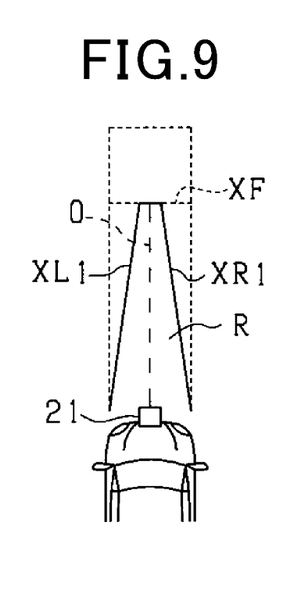
FIG. 9 is an explanatory diagram related to setting of a detection range in a modified example according to an embodiment.

In the description above, the description is given based on a premise that axial misalignment in the horizontal direction has occurred in the radar apparatus 21. However, in the radar apparatus 21, axial misalignment in an up/down direction may also occur, or axial misalignment in both the horizontal direction and the up/down direction may also occur. Therefore, the detection range R may be restricted taking into consideration axial misalignment in the up/down direction of the radar apparatus 21. For example, as shown in FIG. 9, when axial misalignment in the up/down direction occurs, a distance in a depth direction of the detection range R may be restricted. That is, the detection range R may be restricted by the position of the forward regulation position XF being reset to a position moved in a direction approaching the own vehicle 50.

In the description above, an example is given in which the presence of the axial misalignment angle of the radar apparatus 21 is determined. In addition, the above-described processes may be applied to various types of target detection apparatuses that are capable of detecting a target ahead of the own vehicle 50, and calculating the distance between the own vehicle 50 and the target ahead, and a lateral position. For example, the above-described processes may be applied to the above-described imaging apparatus 22.

In the description above, the control mode is determined using the calculation count of the axial misalignment angle. However, the control mode may be determined based on elapsed time after startup of the driving assistance ECU 10 or traveling distance after startup.

In the description above, in the initial mode, the width in the lateral direction is reduced such that the detection range R has left-right symmetry with respect to the axis O of the own vehicle 50. In addition, in the initial mode, the detection range R may be reduced with left-right asymmetry. For example, the extent to which a side that is on the side of an oncoming traffic lane with respect to the own vehicle 50 is reduced may be increased.

In the description above, in the restriction mode, a value corresponding to 3σ of the axial misalignment information is calculated as the statistical dispersion quantity. However, a value corresponding to σ or 2σ of the axial misalignment information may be used as the statistical dispersion quantity. For example, the statistical dispersion quantity may be reduced as the calculation accuracy for the axial misalignment angle increases.

In the restriction mode described above, when the radar apparatus 21 is tilted to either of the left and right, the detection range R of the regulation position in the tilt direction of the radar apparatus 21 may be restricted and the detection range R of the regulation position on the side opposite the tilt direction of the radar apparatus 21 may be expanded within a range that does not exceed the vehicle width of the own vehicle. In this case, control with respect to a target ahead of the own vehicle can be more correctly performed, while suppressing unnecessary control with respect to an erroneously recognized target.

In the description above, in the restriction mode, whether or not the calculation value of the axial misalignment angle is within a predetermined allowable range (such as 0.5 deg) may be determined. When the calculation value of the axial misalignment angle is determined to be outside of the allowable range, the detection range R may be reduced based on the calculation values of the axial misalignment angle and the axial misalignment direction. In this case, when the likelihood of axial misalignment occurring in the radar apparatus 21 is low, the collision avoidance control with respect to the target can be prioritized. When the likelihood of axial misalignment occurring in the radar apparatus 21 is high, avoidance of erroneous determination of the target that is the control subject can be prioritized.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

The invention claimed is:

1. A vehicle control apparatus that is applied to a vehicle in which a target detecting means that detects a target in a periphery of an own vehicle is provided, and performs traveling control of the vehicle based on a detection result of the target detecting means, the vehicle control apparatus comprising:
    an acquiring means for acquiring, at a predetermined cycle, angle misalignment information of the target detecting means that is calculated based on a detection position of the target by the target detecting means;
    a calculating means for calculating a shaft misalignment angle that is a misalignment amount of an attachment angle of the target detecting means and a shaft misalignment direction that indicates either of left and right sides with respect to the own vehicle on which the shaft misalignment of the target detecting means has occurred, by statistically processing a history after startup of the angle misalignment information acquired by the acquiring means;
    a detection range setting means for setting, ahead of the own vehicle, a detection range over which a target to be subjected to traveling control of the own vehicle, among targets detected by the target detecting means, is detected; and
    a detection range restricting means for reducing, until elapse of a predetermined initial period after startup, a width in a lateral direction of the detection range based on a predetermined initial angle that is the misalignment amount of the attachment angle of the target detecting means, and reducing, after the elapse of the initial period after the startup, the width in the lateral direction of the detection range based on the shaft misalignment angle and the shaft misalignment direction calculated by the calculating means.

2. The vehicle control apparatus according to claim 1, wherein:
    the detection range restricting means reduces the detection range with left-right symmetry until the elapse of the initial period after the startup.

3. The vehicle control apparatus according to claim 2, further comprising:
    a means for calculating a statistical dispersion quantity of the angle misalignment information based on a result of statistical processing of the angle misalignment information acquired by the acquiring means, wherein
    the detection range restricting means reduces the width in the lateral direction of the detection range based on the shaft misalignment angle of the target detecting means and the statistical dispersion quantity, after the elapse of the initial period.

4. The vehicle control apparatus according to claim 3, wherein:
    the detection range restricting means reduces a side of the detection range corresponding to the shaft misalignment direction calculated by the calculating means, after the elapse of the initial period.

5. The vehicle control apparatus according to claim 4, further comprising:
    a means for determining that a present time is within the initial period when an acquisition count after startup of the misalignment information acquired by the acquiring means is less than a predetermined count.

6. A vehicle control method performed by a vehicle control apparatus that is applied to a vehicle in which a target detecting means that detects a target in a periphery of an own vehicle is provided, and performs traveling control of the vehicle based on a detection result of the target detecting means, the vehicle control method comprising:
    an acquiring step of acquiring, at a predetermined cycle, angle misalignment information of the target detecting means that is calculated based on a detection position of the target by the target detecting means;
    a calculating step of calculating a shaft misalignment angle that is a misalignment amount of an attachment angle of the target detecting means and a shaft misalignment direction that indicates either of left and right sides with respect to the own vehicle on which the shaft misalignment of the target detecting means has occurred, based on the angle misalignment information;
    a detection range setting step of setting, ahead of the own vehicle, a detection range over which a target to be subjected to traveling control of the own vehicle, among targets detected by the target detecting means, is detected; and
    a detection range restricting step of reducing, until elapse of a predetermined initial period after startup, a width in a lateral direction of the detection range based on a predetermined initial angle that is the misalignment amount of the attachment angle of the target detecting means, and reducing, after the elapse of the initial period after the startup, the width in the lateral direction of the detection range based on the shaft misalignment angle and the shaft misalignment direction calculated at the calculating step.

7. The vehicle control method according to claim 6, wherein:
the detection range restricting step reduces the detection range with left-right symmetry until the elapse of the initial period after the startup.

8. The vehicle control method according to claim 7, further comprising:
a step of calculating a statistical dispersion quantity of the angle misalignment information based on a result of statistical processing of the angle misalignment information acquired at the acquiring step, wherein
the detection range restricting step reduces the width in the lateral direction of the detection range based on the shaft misalignment angle of the target detecting means and the statistical dispersion quantity, after the elapse of the initial period.

9. The vehicle control method according to claim 8, wherein:
the detection range restricting step reduces a side of the detection range corresponding to the shaft misalignment direction calculated at the calculating step, after the elapse of the initial period.

10. The vehicle control method according to claim 9, further comprising:
a step of determining that a present time is within the initial period when an acquisition count after startup of the misalignment information acquired at the acquiring step is less than a predetermined count.

11. The vehicle control apparatus according to claim 1, further comprising:
a means for calculating a statistical dispersion quantity of the angle misalignment information based on a result of statistical processing of the angle misalignment information acquired by the acquiring means, wherein
the detection range restricting means reduces the width in the lateral direction of the detection range based on the shaft misalignment angle of the target detecting means and the statistical dispersion quantity, after the elapse of the initial period.

12. The vehicle control apparatus according to claim 1, wherein:
the detection range restricting means reduces a side of the detection range corresponding to the shaft misalignment direction calculated by the calculating means, after the elapse of the initial period.

13. The vehicle control apparatus according to claim 1, further comprising:
a means for determining that a present time is within the initial period when an acquisition count after startup of the misalignment information acquired by the acquiring means is less than a predetermined count.

14. The vehicle control method according to claim 6, further comprising:
a step of calculating a statistical dispersion quantity of the angle misalignment information based on a result of statistical processing of the angle misalignment information acquired at the acquiring step, wherein
the detection range restricting step reduces the width in the lateral direction of the detection range based on the shaft misalignment angle of the target detecting means and the statistical dispersion quantity, after the elapse of the initial period.

15. The vehicle control method according to claim 6, wherein:
the detection range restricting step reduces a side of the detection range corresponding to the shaft misalignment direction calculated at the calculating step, after the elapse of the initial period.

16. The vehicle control method according to claim 6, further comprising:
a step of determining that a present time is within the initial period when an acquisition count after startup of the misalignment information acquired at the acquiring step is less than a predetermined count.

* * * * *